(12) United States Patent
Poornachandran et al.

(10) Patent No.: US 9,261,370 B2
(45) Date of Patent: Feb. 16, 2016

(54) PROVISION OF NAVIGATION SERVICE INCLUDING REPORTING OF ELEVATION INFORMATION AND/OR VERTICAL GUIDANCE

(75) Inventors: Rajesh Poornachandran, Beaverton, OR (US); Lakshman Krishnamurthy, Portland, OR (US); Uttam Sengupta, Portland, OR (US); Rajsekaran Andiappan, Tampere (FI)

(73) Assignee: Intel Corporation, Santa Clara, CA (US)

( * ) Notice: Subject to any disclaimer, the term of this patent is extended or adjusted under 35 U.S.C. 154(b) by 124 days.

(21) Appl. No.: 13/997,128

(22) PCT Filed: Dec. 28, 2011

(86) PCT No.: PCT/US2011/067670
§ 371 (c)(1),
(2), (4) Date: Oct. 21, 2013

(87) PCT Pub. No.: WO2013/101005
PCT Pub. Date: Jul. 4, 2013

(65) Prior Publication Data
US 2014/0081572 A1    Mar. 20, 2014

(51) Int. Cl.
*G01C 21/20*  (2006.01)
*H04W 4/02*  (2009.01)
(Continued)

(52) U.S. Cl.
CPC ............. *G01C 21/206* (2013.01); *G01C 5/06* (2013.01); *H04W 4/02* (2013.01); *G01S 5/0252* (2013.01)

(58) Field of Classification Search
CPC ................................................... G01C 21/206

USPC .......................................................... 701/537
See application file for complete search history.

(56) References Cited

U.S. PATENT DOCUMENTS

| 8,442,556 | B2 * | 5/2013 | Rawat et al. | 455/456.2 |
| 2004/0033808 | A1 * | 2/2004 | Rorabaugh | 455/456.1 |

(Continued)

FOREIGN PATENT DOCUMENTS

| TW | 200941026 A | 10/2009 |
| TW | 201104280 A | 2/2011 |
| TW | 201144767 A | 12/2011 |

OTHER PUBLICATIONS

Office Action issued Apr. 25, 2014 for Taiwan Application No. 101143678, 12 pages.

(Continued)

*Primary Examiner* — John Q Nguyen
*Assistant Examiner* — Anshul Sood
(74) *Attorney, Agent, or Firm* — Schwabe, Williamson & Wyatt, P.C.

(57) ABSTRACT

Methods, apparatuses and storage medium associated with navigation service are disclosed. In various embodiments, a method may include collecting, by a client mobile device, ambient barometric pressure information at a current location of the client mobile device. The method may further include providing, by the mobile device, contemporaneous navigation assistance to a user of the mobile device or for a user of the mobile device, assisted by a remote navigation assistance service. Assistance by the remote navigation service is associated with determining the current elevation level, based at least in part on ambient barometric pressure information collected by the client mobile device and by one or more crowdsourced mobile devices at the current location. Other embodiments may be disclosed or claimed.

26 Claims, 4 Drawing Sheets

(51) Int. Cl.
*G01C 5/06* (2006.01)
*G01S 5/02* (2010.01)

(56) References Cited

U.S. PATENT DOCUMENTS

| | | |
|---|---|---|
| 2004/0196176 A1 | 10/2004 | Burgett et al. |
| 2006/0100782 A1 | 5/2006 | Levi et al. |
| 2006/0122775 A1 | 6/2006 | Soehren |
| 2007/0016346 A1* | 1/2007 | Alanen et al. ............... 701/4 |
| 2007/0030841 A1* | 2/2007 | Lee et al. ............... 370/352 |
| 2007/0168124 A1* | 7/2007 | Dossas et al. ............. 701/213 |
| 2010/0100318 A1 | 4/2010 | Jung et al. |
| 2011/0050493 A1 | 3/2011 | Torimoto et al. |
| 2012/0013475 A1* | 1/2012 | Farley et al. ............... 340/665 |

OTHER PUBLICATIONS

International Report on Patentability mailed Jul. 10, 2014 for International Application No. PCT/US2011/067670, 9 pages.

Frederic Evennou et al., "Advance integration of WIFI and inertial navigation systems for indoor mobile position." EURASIP Journal on Applied Signal Processing, vol. 2006, Article ID 86706, pp. 1-11.

International Search Report and Written Opinion mailed Sep. 14, 2012 for International Application No. PCT/US2011/067670, 12 pages.

* cited by examiner

PROVISION OF NAVIGATION SERVICE INCLUDING REPORTING OF ELEVATION INFORMATION AND/OR VERTICAL GUIDANCE

CROSS REFERENCE TO RELATED APPLICATIONS

The present application is a national phase entry under 35 U.S.C. §371 of International Application No. PCT/US2011/067670, filed Dec. 28, 2011, entitled "PROVISION OF NAVIGATION SERVICE INCLUDING REPORTING OF ELEVATION INFORMATION AND/OR VERTICAL GUIDANCE", which designated, among the various States, the United States of America. The Specification of the PCT/US2011/067670 Application is hereby incorporated by reference.

TECHNICAL FIELD

This application relates to the technical field of data processing, more specifically to methods and apparatuses associated with provision of navigation service including reporting of elevation information and/or vertical guidance.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in integrated circuit, computing, networking and related technologies have led to widespread adoption of mobile computing devices, such as, smartphones and tablet computers (hereafter simply "mobile device"). Mobiles devices are often employed to provide navigation services, and many mobile devices may include global positioning system (GPS) components to enable the provision of navigation services. However, GPS based navigation systems typically require signals from multiple satellites simultaneously to provide exact position and elevation information within few meters; which may be limited within high rise buildings/structures, as the building/structure, improvements therein, and/or furniture often block the satellite signals, especially in interior sections away from the windows. As a result, current GPS navigation systems in smartphones are typically very imprecise, when the smartphones are located inside high rise buildings/structures (hereinafter, simply, buildings). While the smartphones may provide approximate assessments based on their last known locations, in general, their navigational abilities are so in exact that a few floors can stand between the goal they indicate and the actual one, making current smartphones poor entities for providing navigation service indoor, especially within a high-rise building. This could pose a challenge, for example, to emergency responders (E911) responding to an emergency in a high rise building. The emergency responders may be able to determine only the ground level location of caller, but not the floor the caller is on.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION

Methods, apparatuses and storage medium associated with navigation service are disclosed. In various embodiments, a method may include collecting, by a client mobile device, ambient barometric pressure information at a current location of the client mobile device. The method may further include providing, by the client mobile device, contemporaneous navigation service to a user of the client mobile device or for the user of the client mobile device, assisted by a remote navigation assistance service. Provision of navigation service to the user may include providing vertical navigation guidance to the user based at least in part on a determined current elevation level of the client mobile device. Provision of navigation service for the user may include reporting the determined current elevation level. Assistance by the remote navigation service may be associated with determining the current elevation level based at least in part on ambient barometric pressure information (and GPS information, if available) collected by the client mobile device and by one or more crowd-sourced mobile devices at the current location.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise, not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

Figure 1:
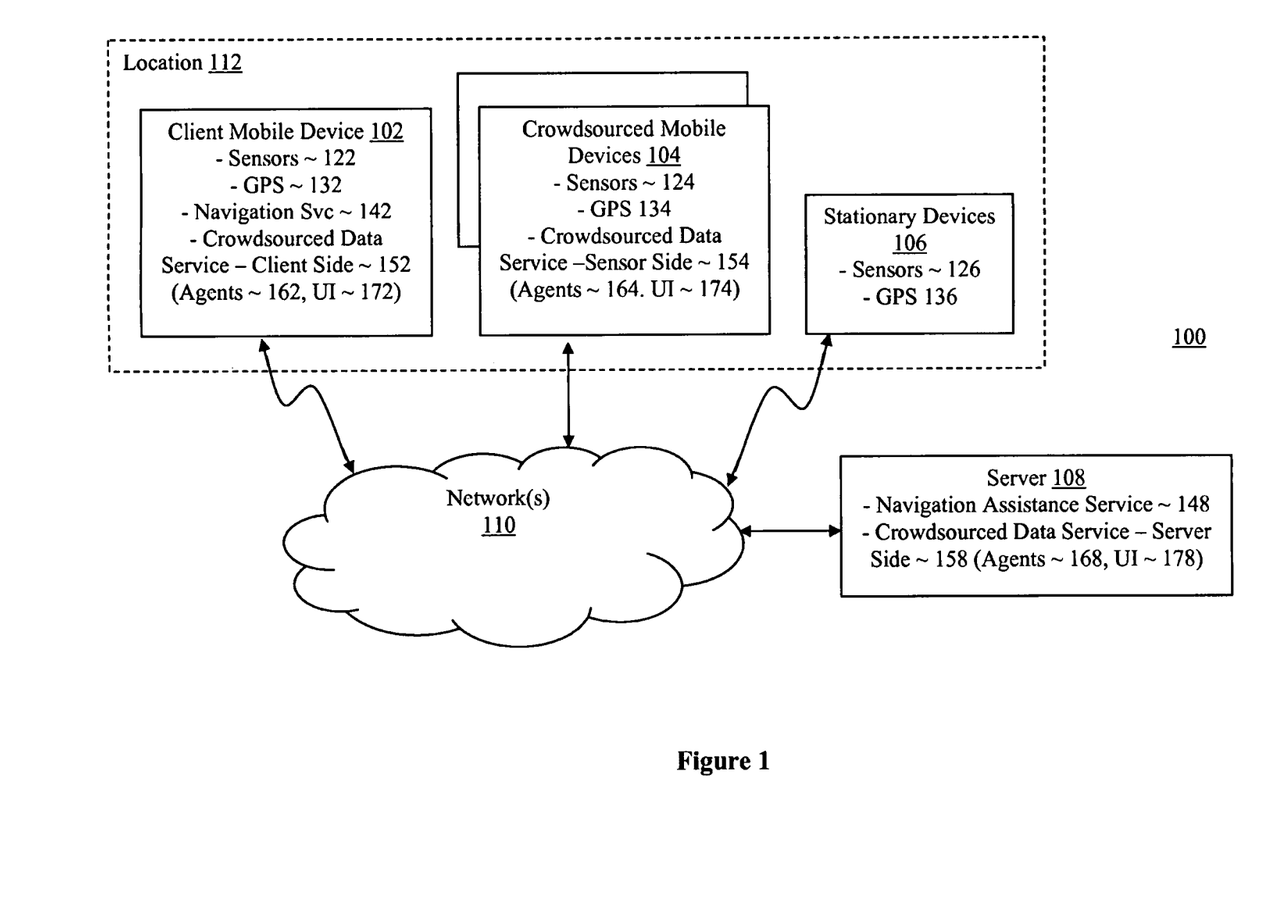
FIG. 1 illustrates a network of devices for providing navigation service, including reporting of elevation information and/or vertical guidance.

FIG. 1 illustrates an example network of devices for providing navigation service, including reporting of elevation information and/or vertical guidance, in accordance with various embodiments of the present disclosure. As shown, network of devices 100 may include client mobile device 102, crowdsourced mobile devices 104, and server 108 coupled to each other, via network(s) 110. In FIG. 1, client mobile device 102 and crowdsourced mobile devices 104 are illustrated in an instance in time where the devices are located at various elevation levels at location 112, which, e.g., may be a multi-story building. Being mobile devices, at other instances in time, client mobile device 102 and some or all of crowdsourced mobile devices 104 may or may not be located at the same elevation levels and/or location 112. As will be described in further detail below, devices 102-104 and 108 may be configured to cooperate with each other to enable client mobile device 102 to be potentially more effective in providing navigation service 142, including but are not limited to, improved reporting of the current location of mobile client device 102 with more accurate elevation information, and/or more accurate vertical navigation guidance at location 112 to a user of client mobile device 102. In particular, crowdsourced mobile devices 104 may be configured to collect and provide at least geographical information, including elevation information, and ambient barometric pressure information to server 108. Server 108 may use the provided at least geographical information, including elevation information, and/or ambient barometric pressure information to assist client mobile device 102 in providing the improved navigation service 142, leveraging the relationship between altitude and barometric pressure in earth's atmosphere. Thus, mobile device 102 is referred to as client mobile device 102 of server 108, and mobile devices 104 are referred to as crowdsourced mobile devices 104 of server 108, where the tasks of data collection, e.g., the collection of geographical information, including elevation information, and associated ambient barometric pressures, at various elevations of location 112, are outsourced.

The outsourcing of data collection potentially enables server 108 to have more accurate data to use to assist client mobile device 102 in providing navigation service, including reporting of elevation and/or vertical guidance. This may be due to the fact that certain data, such as GPS data, especially the elevation information, when collected within a high rise building, may be relatively sensitive to whether the collecting devices are located in the interior or near the windows of the high rise buildings. Similarly, it may also be due to the fact that ambient barometric pressures, when collected within a high rise building, may be relatively sensitive to the ambient conditions of the collection points, e.g., weather, ventilation, air conditioning, and so forth. In various embodiments, the employment of crowdsourced mobile devices enable the determination of elevation levels to be calibrated and/or re-calibrated from time to time to reflect the change in air pressure (due to weather, air circulation, heating, and so forth). Changes in air pressure due to environment effects could be as much as +/−40 hpa. In various embodiments, the employment of crowdsourced mobile devices enables employment of accurate digital barometric sensors to facilitate mapping of barometric pressure to elevation with a resolution of +/−0.25 m.

Depending on applications, and/or precision desired, location 112 may be smaller or bigger than a single multi-story building. Location 112 may include a building and its vicinity or even a block of buildings.

Additionally, for the illustrated embodiments, network of devices 100 may further include stationary devices 106 of location 112, configured to be able to provide at least geographical information, including elevation information, and barometric pressure information, to supplement the information provided by crowdsourced mobile devices 104. In various embodiments, stationary devices 106 may be located at different elevations, e.g., different floors, at location 112. Similarly, stationary devices 106 may also be coupled to server 108 through network(s) 110. Examples of stationary devices may include, but are not limited to thermostats, light switches, network access points, and so forth, incorporated with the proper sensors and communication capabilities.

In various embodiments, client mobile devices 102, crowdsourced mobile devices 104, and stationary devices 106, if provided, may be respectively configured with one or more sensors 122, 124 and 126. Sensors 122, 124 and 126, as alluded to earlier, may include one or more barometric pressure sensors configured to provide readings on ambient barometric pressures. Further, sensors 122 and 124 may include one or more inertial sensors configured to provide readings on movements of client and crowdsoruced mobile devices 102 and 104. Examples of inertial sensors may include pedometer sensors, accelerometer sensors, gyroscopes, and so forth. Further, client mobile devices 102, crowdsourced mobile devices 104 and/or stationary devices 106, may also be respectively configured with GPS components 132, 134 and 136 to provide current location information, including elevation information, of devices 102, 104 and 106. Recall, the precision of the information collected/provided may vary, depending on the location/elevation and/or surrounding conditions of devices 102, 104 and 106. In various embodiments, some or all of stationary devices 106 may be provided (e.g., hard coded) with their geographical, including elevation, information, in lieu of or in addition to having GPS components 136.

In various embodiments, client mobile device 102 may include navigation service 142, and client side of crowdsourced data service 152. Navigation service 142 may be configured to provide navigation service to a user of client mobile device 102, including but are not limited to reporting of current location (geographic information), including elevation information, and/or vertical guidance. Navigation service 142 may be configured to provide the navigation service with the assistance of server 108. In various embodiments, client side of crowdsourced data service 152 may be configured to enable provision of assistance by server 102.

In various embodiments, each crowdsourced mobile device 104 may include a copy of sensor side of crowdsourced data service 154. Collectively, the various copies of sensor side of crowdsourced data service 154 may be configured to enable cooperative collection of the data used by server 108 to assist client mobile device 102. In various embodiments, the copies of sensor side-crowdsourced data service 154 respectively deployed on crowdsourced mobile devices 104 may be identical or different, so long they are configured to contribute in collecting and providing data to server 108 to assist client mobile device 102.

In various embodiments, each of client side of crowdsourced data service 152 and sensor side of crowdsourced data service 154.may include a number of agents 162 or 164. In various embodiments, these agents 162 or 164 may include an authentication agent, a policy storage/enforcement agent, a logging agent and a communication agent. The authentication agent may be configured to authenticate the corresponding mobile device to server 108, and vice versa. The policy storage/enforcement agent may be configured to be responsible for storing, retrieving and enforcing one or more policies with respect to collecting and/or reporting of sensing and related data to server 108, and/or requesting, receiving, and using assistance received from server 108, developed based at least in part on the sensing and related data collected through crowdsourcing. Examples of policies with respect to collecting and/or reporting of sensing and related data to server 108 may include, but are not limited to, to the frequency of sampling, frequency and format of reporting, and so forth. Examples of policies with respect to requesting, receiving, and using assistance received from server 108 may include, but are not limited to, requesting determination of elevation or requesting for a mapping of barometric pressure to elevation, and so forth. The logging agent may be configured to log transactions with server 108. The communication agent may be configured to communicate with server 108. In various embodiments, the communication may be conducted over jointly established secured channels pair-wise coupling mobile devices 102/104 and server 108. In other embodiments, the present disclosure may be practiced with more or less agents 162/164.

In various embodiments, agents 162 and agents 164 may include only subset of the functions corresponding to the roles of client mobile device 102 or crowdsourced mobile device 104. In alternate embodiments, agents 162 and agents 164 may be identical to enable client mobile device 102 and any crowdsourced mobile device 104 to reverse roles. For these embodiments, such crowdsourced mobile devices 104 may further include navigation service 142.

In various embodiments, each of client side of crowdsourced data service 152 and sensor side of crowdsourced data service 154 may include a user interface (UI) 172 or 174. The user interface 172 or 174 may be configured to enable the user of the client/crowdsourced mobile device 102/104 to configure sensors 122, GPS 132, various configurable parameters of agents 162/164, and/or other operational aspects of client/crowdsourced mobile device 102/104, in particular, those operational aspects associated with collecting and reporting sensed data, and/or provision of navigation service. In various embodiments, the user interface 172/174 may be provided through navigation service 142. In various embodiments, the implementation logic of UI 172/174 may also be configured to configure sensors 122, GPS 132, various configurable parameters of agents 162/164, and/or operational aspects of client/crowdsourced mobile device 102/104, in response to instructions from server side of crowdsourced data service 158.

In various embodiments, client side of crowdsourced data service 152 and sensor side of crowdsourced data service 154 may be implemented in hardware, software, or a combination of hardware and software. In various embodiments, client/crowdsourced mobile device 102/104 may include a main application execution environment, and a secured execution environment that is separate and independent of the main application execution environment, as well as secured from the applications executing in the main application execution environment (to be described in more detail later with references to FIG. 3). The secured execution environment may include secured storage for use to store sensitive data, e.g., policies governing the collection and/or reporting of data, in the case of crowdsourced mobile devices 104, and policies governing the request and/or usage of assistance from server 108, in the case of client mobile device 102. In various ones of these embodiments, the software portions of client side of crowdsourced data service 152 and sensor side of crowdsourced data service 154 may be executed in the secured execution environment.

Mobile devices 102 and 104, except for the incorporation of sensors 122 and 124, GPS 132 and 134, crowdsourced data services 152 and 154, and the manner mobile devices 102 and 104 cooperate with each other and server 108 (and with stationary devices 106, if employed), are intended to represent a broad range of mobile devices known in the art. Examples of mobile devices may include smartphones, computing tablets, and so forth. Examples of smartphones and computing tablets may include but are not limited to those available from Apple Computer of Cupertino, Calif., and Samsung Corporation of Seoul, Korea.

In various embodiments, server 108 may be configured with navigation assistance service 148, and crowdsourced data service—server side 158. Crowdsourced data service server side 158 may be configured to receive at least geographical information, including elevation information, and ambient barometric pressure information of various elevation levels at location 112, from crowdsourced mobile devices 104 (and stationary devices 106, if used). Likewise, crowdsourced data service—server side 158 may include agents 168 and UI 178 configured with functions similar to the earlier described functions of agents 162/164 and UI 172/174. In particular, the implementation logic of UI 178 may be configured to instruct the implementation logic of UI 172/174 in configuring sensors 122/124, GPS 132/134, various configurable parameters of agents 162/164, and/or various other operational aspects of mobile devices 102/104. In various embodiments, the implementation logic of UI 178 may be further configured to maintain a history of the configuration instructions to facilitate future formulation of configuration/re-configuration instructions. Navigation assistance service 148 may be configured to assist client mobile device 102 in providing navigation service at location 112, based at least in part on the information received by crowdsourced data service—server side 158. As described earlier, the assistance may include but not limited to assisting navigation service 142 in reporting of elevation information and/or vertical navigation assistance. The assistance may include provision of the current elevation of client mobile device 102 to client mobile device 102 or providing a mapping function mapping barometric pressure to elevation to client mobile device 102, to enable client mobile device 102 to be able to more accurately determine its current elevation. Either case, the provision of the current elevation of client mobile device 102 or the provision of the mapping function, as described earlier, may be effectuated based at least in part on the information received by crowdsourced data service—server side 158. In various embodiments, as an integral part of providing assistance to client mobile device 102, or as an independent function, navigation assistance service 148 may also rank or sort the elevations of crowdsourced mobile devices 104. In various embodiments, as an integral part of providing assistance to client mobile device 102, or as an independent function, navigation assistance service 148 may also assess and determine the data reliability of crowdsourced mobile devices 104, and rank or sort them accordingly.

Server 108, except for navigation assistance service 148 and crowdsourced data service—server side 158, is intended to represent a broad range of server elements known in the art. Examples of servers may include those available from Hewlett Packard. of Palo Alto, Calif., and Dell Computer of Austin, Tex.

Network(s) 110 may include one or more wired and/or wireless, local and/or wide area, private and/or public networks. An example of public network may include, but is not limited to, the Internet.

Before further describing the navigation service scheme of the present disclosure, it is noted that while for ease of understanding, the present disclosure is being described with a client mobile device 102, a number of crowdsourced mobile devices 104, and a server 108, cooperating with each other. However, the disclosure is not so limiting. At any point in time and/or location, there may be multiple client mobile devices 102. In alternate embodiments, client mobile device 102 and crowdsourced mobile devices 104, when properly equipped, may switch roles. Similarly, a crowdsourced mobile device 104, when properly equipped, may assume the role of server 108. Further, crowdsourced mobile devices 104 may collect and provide data to client mobile device 102 directly, with client mobile device subsuming the role of server 108. Other alterations are also possible.

Figure 2:
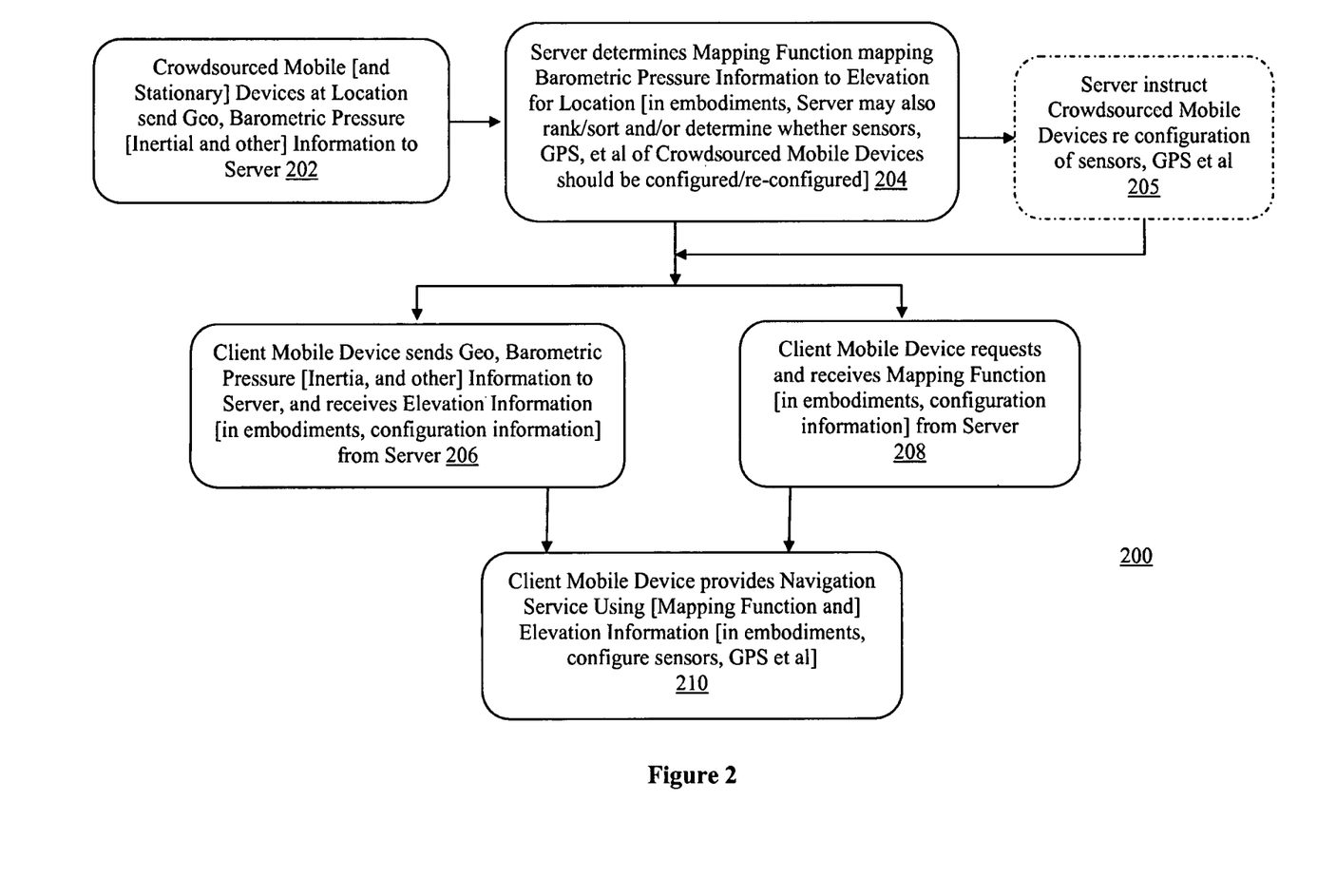
FIG. 2 illustrates a method for providing navigation service, including reporting of elevation information and/or vertical guidance.

FIG. 2 illustrates a method for providing navigation service, including vertical guidance, in accordance with various embodiments of the present disclosure. As shown, method 200 may start at block 202, with crowdsourced mobile devices 104 (e.g., crowdsourced data service sensor side 154), and stationary devices 106, if provided, collecting and providing geographical, including elevation, and ambient barometric pressure information of location 112 to server 108. In various embodiments, crowdsourced mobile devices 104 may further provide inertial information, in addition to or in lieu of the geographical information, to enable server 108, to estimate or refine the elevation levels of crowdsourced mobile devices 104 at location 112. In alternate embodiments, crowdsourced mobile devices 104, and stationary devices 106, if provided, may additionally, or in the alternative, provide elevation level information, e.g., in the form of floor numbers. In alternate embodiments, crowdsourced mobile devices 104, and stationary devices 106, if provided, may additionally, or in the alternative, provide location information, e.g., in the form of an address, building or landmark name.

From block 202, method 200 may proceed to block 204, where server 108 (e.g., navigation assistance service 142) may determine a mapping function mapping barometric pressure to elevation for location 112, based at least in part on the geographical and barometric pressure information received (and inertial, if also received).

In various embodiments, at block 204, server 108 (e.g., implementation logic associated with UI 178 of crowdsourced data service—server side 158) may further rank or sort the crowdsourced mobile devices 104 by their elevations. In various embodiments, the ranking and sorting may be practiced on a relative basis. For example, at an initial period, where there are limited data, the lowest reported barometric value may be correlated with the highest known floor, and/or the highest reported barometric value may be correlated with the lowest known floor. As more data became available, the range of floors may be narrowed, and the mapping with more precise resolution may be developed. Server 108 (e.g., implementation logic associated with UI 178 of crowdsourced data service—server side 158) may also determine whether any one of sensors 124, GPS 134, and/or configurable parameters of Agents 164 et al of any one of crowdsourced mobile devices 104 should be configured or re-configured differently. For these embodiments, from block 204, method 200 may proceed to block 205. At block 205, server 108 may instruct applicable ones of crowdsourced mobile devices 104 (e.g., those located at interior sections of location 112) to configure/re-configure applicable ones of sensors 124, GPS 134, configurable parameters of Agents 164 et al, including modifying or updating operational policies.

From block 204, or after going through block 205, method 200 may proceed to either block 206 or block 208. At block 206, client mobile device 102 (e.g., crowdsourced data service—server side 158) may send at least its geographic information and barometric pressure readings, and inertial readings, if collected, to server 108. In response, server 108 (e.g., navigation assistance service 148) may use the mapping function and the received information to determine a current elevation level of client mobile device 102, and return the determined current elevation level to client mobile device 102. At block 208, client mobile device 102 (e.g., crowdsourced data service—client side 152) may request and receive the mapping function from server 108 instead. In various embodiments, at block 204 or 208, client mobile device 102 (e.g., implementation logic of UI 172 of crowdsourced data service—client side 152) may also receive instructions from server 108 to configure/re-configure applicable ones of sensors 122, GPS 142, configurable parameters of agents 162 et al, including modifying or updating operational policies.

From either block 206 or 208, method 200 may proceed to block 210, where navigation service 142 of client mobile device 102 may provide navigation service, including vertical guidance, based at least in part on the elevation level received from server 108, or determined itself. In the latter scenario, client mobile device 102 (e.g., crowdsourced data service—client side 152) may determine its current elevation level using the mapping function received. Accordingly, client mobile device 102, with assistance from server 108, may be potentially more effective in providing navigation service at location 112, especially on vertical guidance, and/or reporting its current elevation. In various embodiments, at block 210, if instructed, implementation logic of UI 172 may also configure/re-configure applicable ones of sensors 122, GPS 142, configurable parameters of agents 162 et al, including modifying or updating operational policies, in accordance with the instructions.

Figure 3:
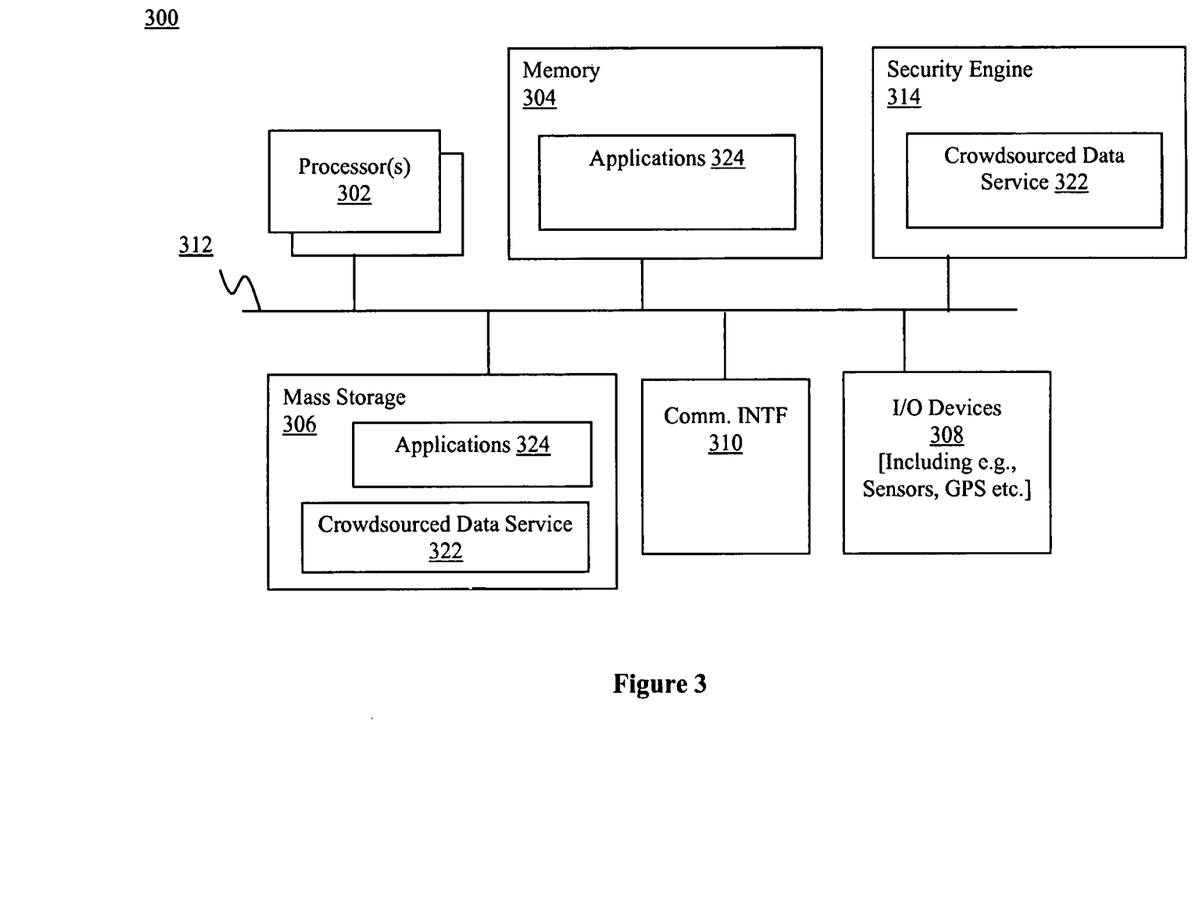
FIG. 3 illustrates an example computer suitable for use as a mobile device or a server of FIG. 1.

FIG. 3 illustrates an example computer system suitable for use as a mobile device or a server of FIG. 1, in accordance with various embodiments of the present disclosure. As shown, computing system 300 includes a processor and memory arrangement having a number of processors or processor cores 302, security engine 314 having secured storage, and system memory 304. For the purpose of this application, including the claims, the terms "processor" and "processor cores" may be considered synonymous, unless the context clearly requires otherwise. Additionally, computing system 300 includes mass storage devices 306 (such as diskette, hard drive, compact disc read only memory (CD-ROM) and so forth), input/output (I/O) devices 308 (such as the earlier described barometric pressure sensors, inertial sensors and/or GPS components), and communication interfaces 310 (such as, WiFi, Bluetooth, 3G/4G network interface cards, modems and so forth). The elements may be coupled to each other via system bus 312, which represents one or more buses. In the case of multiple buses, the multiple buses may be bridged by one or more bus bridges (not shown).

Each of these elements may be configured to perform its conventional functions known in the art. In particular, processors 302 may be configured to provide an application execution environment, and security engine may be configured to provide a secure execution environment that is separate and independent of the application execution environment. Thus execution within the secure execution environment may be protected from applications executing in the application execution environment. Further, system memory 304 and security engine may be respectively employed to store a working copy of the programming instructions configured to implement the applications 324 and perform all or selected operations of method 200 earlier described with references to FIG. 2, herein collectively denoted as, crowdsourced data service 322 (which may be the client, sensor or server side). Applications 324 and crowdsourced data service 324 may be implemented by assembler instructions supported by processor(s) 302 or high-level languages, such as, e.g., C, that can be compiled into such instructions. In alternate embodiments, all or portions of crowdsourced data service 322 may be implemented in hardware.

Mass storage 306 may include a persistent copy of the programming instructions of applications 324 and crowdsourced data service 322. The persistent copy of these programming instructions may be placed into mass storage 306 in the factory, or in the field, through, e.g., a distribution medium (not shown), such as a compact disc (CD), or through communication interface 310 (from a distribution server (not shown)). That is, one or more distribution media having an implementation of crowdsourced data service 322 may be employed to distribute crowdsourced data service 324322 to program various computing devices to operate as client device 102, crowdsourced mobile device 104 or server 108.

Otherwise, the constitution of the depicted elements 302-314 are known, and accordingly will not be further described. In various embodiments, computing system 300 may have more or less components, and/or different architectures.

Figure 4:
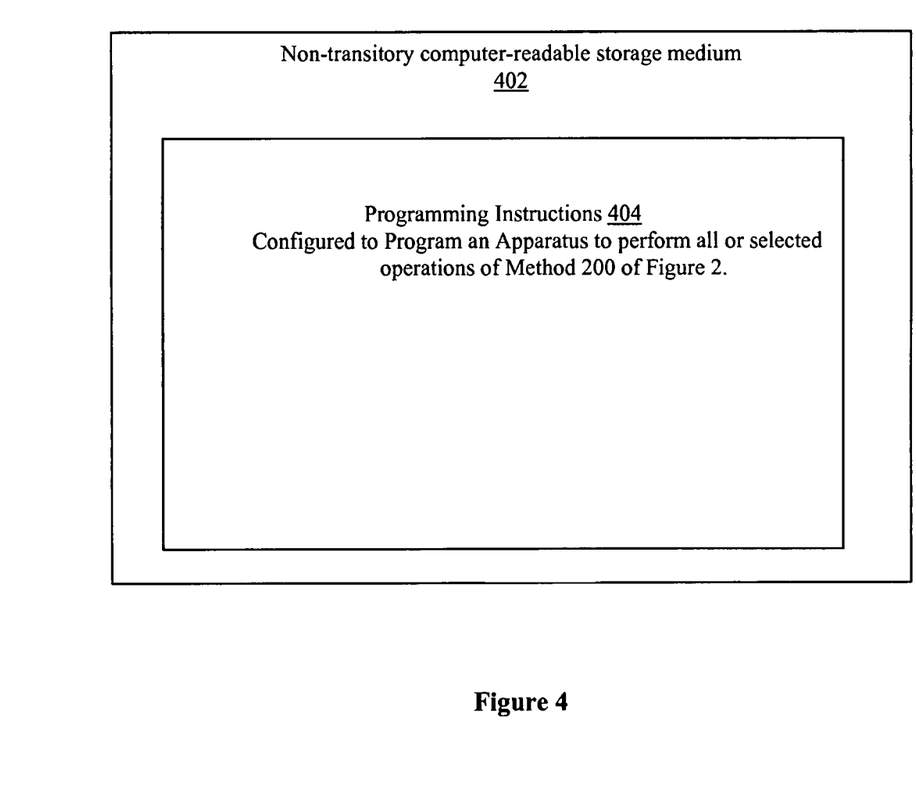
FIG. 4 illustrates an example non-transitory computer-readable storage medium having instructions configured to practice all or selected aspects of the method of FIG. 2; all arranged in accordance with embodiments of the present disclosure.

FIG. 4 illustrates an example non-transitory computer-readable storage medium having instructions configured to practice all or selected aspects of the method of FIG. 2; in accordance with various embodiments of the present disclosure. As illustrated, non-transitory computer-readable storage medium 402 may include a number of programming instructions 404. Programming instructions 404 may be configured to enable a device 102, 104 or 108, in response to execution of the programming instructions, to perform the corresponding client, sensor or server operations of method 200 earlier described with references to FIG. 2. In alternate embodiments, programming instructions 404 may be disposed on multiple non-transitory computer-readable storage media 402 instead.

Referring back to FIG. 3, for one embodiment, security engine 314 may be packaged together with crowdsourced data service 322 configured to practice the client, sensor or server operations of the method of FIG. 2 to form a System in Package (SiP). For one embodiment, security engine 314 may be integrated on the same die with 322 configured to practice the client, sensor or server operations of the method of FIG. 2. For one embodiment, security engine 314 may be integrated on the same die with crowdsourced data service 322 configured to practice the client, sensor or server operations of the method of FIG. 2 to form a System on Chip (SoC). For at least one embodiment, the SoC may be utilized in a smartphone, a computing tablet, or other mobile devices.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

What is claimed is:

1. At least one non-transitory computer-readable storage medium having instructions to cause a client mobile device, in response to execution of the instructions by the client mobile device, to:
   collect ambient barometric pressure information at a current location of the client mobile device; and
   provide contemporaneous navigation service to a user of the client mobile device, or for the user of the client mobile device, assisted by a remote navigation assistance service operated from a remote server, wherein provision of navigation service to the user includes provision of vertical navigation guidance to the user based at least in part on a determined current elevation level of the client mobile device, wherein provision of navigation service for the user includes reporting of the determined current elevation level, and wherein assistance by the remote navigation service is associated with determination of the current elevation level employing a mapping function that maps barometric information to elevation level, wherein the mapping function is determined by the remote navigation service based at least in part on ambient barometric pressure and elevation information collected by one or more crowdsourced mobile devices at the current location, on a ranked basis, wherein as part of the determination of the mapping function, the remote navigation service determines and ranks reliability of the crowdsourced mobile devices on their reported ambient barometric pressure and elevation information, including provision of configuration instructions for sensors of interior disposed ones of the one or more crowdsourced mobile devices, and wherein the client mobile device, the remote server, and the one or more crowdsourced mobile devices are different devices.

2. The at least one computer-readable storage medium of claim 1, wherein the instructions are further to cause the client mobile device, in response to execution of the instructions by the client mobile device, to send the ambient barometric pressure information collected by the client mobile device to the remote navigation assistance service; and receive from the remote navigation assistance service, the current elevation level of the client mobile device determined based at least in part on the ambient barometric pressure information sent by the client mobile device, using the mapping function.

3. The at least one computer-readable storage medium of claim 1, wherein the instructions are further to cause the client mobile device, in response to execution of the instructions by the client mobile device, to send to the remote navigation assistance service, a request for the mapping function to map barometric pressure to elevation level for the current location; receive from the remote navigation assistance service, the mapping function; and determine the current elevation level of the client mobile device using the mapping function and the ambient barometric pressure information collected by the client mobile device.

4. The at least one computer-readable storage medium of claim 1, wherein collect by the client mobile device further comprises collect by the client mobile device inertial information, wherein determination of the current elevation level by the client mobile device is further based on collected inertial information.

5. The at least one computer-readable storage medium of claim 4, wherein inertial information comprises readings of pedometer sensors, accelerometer sensors or gyroscopes of the client mobile device and the plurality of crowdsourced mobile devices.

6. The at least one computer-readable storage medium of claim 1, wherein the instructions are further to cause the client mobile device, in response to execution of the instructions by the client mobile device, to receive from the user or the remote navigation assistance service, instructions to configure one or more sensor of the client mobile device with respect to the collection of ambient barometric pressure.

7. An apparatus, comprising:
a processor and memory arrangement;
at least one barometric sensor coupled with the processor and memory arrangement;
a client side of a crowdsourced data service to be operated by the processor and memory arrangement to use the at least one barometric sensor to collect ambient barometric pressure information at a current location of the apparatus; and
a navigation service to be operated by the processor and memory arrangement to provide contemporaneous navigation service to a user of the apparatus or for the user of the apparatus, assisted by a remote navigation assistance service operated from a remote server, wherein provision of navigation service to the user includes provision of vertical navigation guidance to the user based at least in part on a determined current elevation level of the apparatus, wherein provision of navigation service for the user includes reporting of the determined current elevation level, and wherein assistance by the remote navigation service is associated with determination of the current elevation level employing a mapping function that maps barometric information to elevation level, wherein the mapping function is determined by the remote navigation service based at least in part on ambient barometric pressure and elevation information collected by one or more crowdsourced apparatuses, on a ranked basis, wherein as part of the determination of the mapping function, the remote navigation service determines and ranks reliability of the crowdsourced mobile devices on their reported ambient barometric pressure and elevation information, including provision of confiouration instructions for sensors of interior disposed ones of the one or more crowdsourced mobile devices, wherein the apparatus, the remote server, and the one or more crowdsourced mobile devices are different devices.

8. The apparatus of claim 7, wherein the client side of the crowdsourced data service is to further send the collected ambient barometric pressure information to the remote navigation assistance service; and receive from the remote navigation assistance service, the current elevation level of the apparatus.

9. The apparatus of claim 7, wherein the client side of the crowdsourced data service is to further send to the remote navigation assistance service, a request for the mapping function to map barometric pressure to elevation for the current location; receive from the remote navigation assistance service, the mapping function; and determine the current elevation level of the apparatus using the mapping function and the ambient barometric pressure information collected by the apparatus.

10. The apparatus of claim 7, wherein the apparatus further comprises one or more inertial sensors, and the client side of the crowdsourced data service is to further collect inertial information, wherein determination of the current elevation level is additionally based on collected inertial information.

11. The apparatus of claim 10, the one or more inertial sensors comprise at least one of a pedometer sensor, an accelerometer sensor or a gyroscope, coupled with the processor and memory arrangement, wherein inertial information comprises at least one reading of the at least one of a pedometer sensor, an accelerometer sensor or a gyroscope.

12. The apparatus of claim 7, wherein the client side of the crowdsourced data service comprises one or more of an authentication agent to authenticate the client mobile device to the remote server, and vice versa, a policy storage and enforcement agent to store, retrieve and enforce operational policies, a logging agent to log transactions with the remote server, and a communication agent to communicate with the remote server.

13. At least one non-transitory computer-readable storage medium having instructions to cause a server, in response to execution of the instructions by the server, to:
receive barometric pressure information and elevation information of a plurality of crowdsourced mobile devices at a location; and
determine a mapping of barometric pressure to elevation for the location, based at least in part on received barometric pressure information and elevation information of the plurality of crowdsourced mobile devices, on a ranked basis, wherein as part of the determination of the mapping function the server is further caused to determine and rank reliability of the crowdsourced mobile devices on their reported ambient barometric pressure and elevation information and to provide configuration instructions for sensors of interior disposed ones of the one or more crowdsourced mobile devices, wherein the mapping enables determination of a current elevation level of a client mobile device at the location, wherein determination of the current elevation level of the client mobile device is used by the client mobile device to provide navigation service; and wherein the server, the plurality of crowdsourced mobile devices and the client mobile device are different devices.

14. The at least one computer-readable storage medium of claim 13, wherein receive comprises respectively receive the barometric pressure information and the elevation information of the plurality of crowdsourced mobile devices, from the plurality of crowdsourced mobile devices.

15. The at least one computer-readable storage medium of claim 13, wherein the instructions are to further cause the server, in response to execution of the instructions by the server, to receive one or more readings of one or more stationary barometric pressure sensors at the location, and wherein determination of a mapping is further based on the one or more readings.

16. The at least one computer-readable storage medium of claim 13, wherein the instructions are to further cause the server, in response to execution of the instructions by the server, to:
receive barometric pressure of the client mobile device at the location;
determine a current elevation level of the client mobile device, using the mapping and received barometric pressure of the client mobile device; and
send a determined current elevation level to the client mobile device.

17. The at least one computer-readable storage medium of claim 16, wherein the instructions are to further cause the server, in response to execution of the instructions by the server, to instruct the client mobile device on configuring one or more sensors of the client mobile device for collection of barometric pressure, or one or more policies governing the collecting of barometric pressure.

18. The at least one computer-readable storage medium of claim 13, wherein the instructions are to further cause the server, in response to execution of the instructions by the server, to receive from the client mobile device, a request for the mapping; and provide to the client mobile device, the mapping.

19. An apparatus comprising:
a processor and memory arrangement;
a server side of a crowdsourced data service to be operated by the processor and memory arrangement to:
receive barometric pressure information elevation information of a plurality of crowdsourced mobile devices at a location; and
determine a mapping of barometric pressure to elevation for the location, based at least in part on received barometric pressure information and elevation information of the plurality of crowdsourced mobile devices on a ranked basis, wherein as part of the determination of the mapping function, the server side of the crowdsourced data service is to further determine and rank reliability of the crowdsourced mobile devices on their reported ambient barometric pressure and elevation information, including provision of configuration instructions for sensors of interior disposed ones of the one or more crowdsourced mobile devices, wherein the mapping enables determination of a current elevation level of a client mobile device at the location; and
a navigation assistance service to be operated by the processor and memory arrangement to assist the client mobile device, based at least in part on the mapping, in provision of navigation service;
wherein the apparatus, the plurality of crowdsourced mobile devices and the client mobile device are different devices.

20. The apparatus of claim 19, wherein the server side of the crowdsourced data service is to respectively receive the barometric pressure information and elevation information of the plurality of crowdsourced mobile devices, from the plurality of crowdsourced mobile devices.

21. The apparatus of claims 19, wherein the server side of the crowdsourced data service is to further receive one or more readings of one or more stationary barometric pressure sensors at the location, and wherein determination of a mapping is further based on the one or more readings.

22. At least one non-transitory computer-readable storage medium having instructions to cause a crowdsourced mobile device, in response to execution of the instructions by the crowdsourced mobile device, to:
collect ambient barometric pressure information and elevation information at a location of the crowdsourced mobile device;
send collected ambient barometric pressure information and elevation information to a server, to enable the server to determine a mapping of barometric pressure to elevation level at the location, to assist a client mobile device, based at least in part on the mapping, in providing navigation service, wherein determination of the mapping is based at least in part on the ambient barometric pressure information sent from the crowdsourced mobile device and other crowdsourced mobile devices on a ranked basis; wherein as part of the determination of the mapping function, the remote navigation service determines and ranks reliability of the crowdsourced mobile devices on their reported ambient barometric pressure and elevation information, including provision of configuration instructions for sensors of interior disposed ones of the one or more crowdsourced mobile devices;
wherein the crowdsourced mobile device, the server, and the client mobile device are different devices.

23. The storage medium of claim 22, wherein the instructions are to further cause the crowdsourced mobile device, in response to execution of the instructions by the crowdsourced mobile device, to receive instructions, from the server, on configuring one or more sensors of the crowdsourced mobile device on collection of barometric pressure.

24. A crowd-source mobile device, comprising:
a processor and memory arrangement;
at least one barometric sensor coupled with the processor and memory arrangement; and
a sensor side of a crowdsourced data service to be operated by the processor and memory arrangement to use the at least one barometric sensor to collect ambient barometric pressure information at a current location of the apparatus, and send collected ambient barometric pressure information along with elevation information to a server, to enable the server to determine a mapping of barometric pressure to elevation level at the location, to assist a client mobile device, based at least in part on the mapping, in providing navigation service, wherein determination of the mapping is based at least in part on the ambient barometric pressure information sent from the crowdsourced mobile devices and other crowdsourced mobile devices on a ranked basis; wherein as part of the determination of the mapping function, the remote navigation service determines and ranks reliability of the crowdsourced mobile devices on their reported ambient barometric pressure and elevation information, including provision of configuration instructions for sensors of interior disposed ones of the one or more crowdsourced mobile devices;
wherein the crowd-source mobile device, the server, and the client mobile device are different devices.

25. The crowd-source mobile device of claim 24, further comprising at least one inertial sensor coupled with the processor and memory arrangement; wherein the sensor side of a crowdsourced data service is to further collect at least one inertial information, and send the inertial information to the server, wherein determination of the mapping is further based at least in part on the inertial information sent.

26. The crowd-source mobile device of claim 24, wherein the processor and memory arrangement further comprises a security engine to provide a secured execution environment to execute the sensor side of the crowdsourced data service.

* * * * *